2,783,894

MICROPOROUS NYLON FILM

Stanley P. Lovell, Newtonville, and John H. Bush, Needham, Mass., assignors, by mesne assignments, to Millipore Filter Corporation, Watertown, Mass., a corporation of Massachusetts No Drawing. Continuation of application Serial No. 184,265, September 11, 1950. This application March 24, 1955, Serial No. 496,618

7 Claims. (Cl. 210—203)

This invention comprises a new and improved porous or microporous nylon film of a new stable form of nylon polymer and includes within its scope a novel process of producing the same.

An important field of use of our new product is in the filtration of extremely small bodies or objects from aerosols or hydrosols. Both for biological laboratory techniques and for industrial filtration a solution has long been sought for the problem of providing a filter capable of the separation of objects from one-fifth to one-half of one micron in size. To meet the optimum requirements, such filter must allow a free and rapid flow of the vehicle, whether gaseous or liquid, through the filter barrier. Further it should leave the filtered bacteria or other residue deposited upon its surface and not entrained or involved within its own structure. Finally, it should be tough, durable and strong and thus capable of use in relatively large areas of exposure.

Heretofore filters designed to do this work have comprised columns of adsorptive material such as bauxite, kieselguhr, or fused barriers such as frits or unglazed porcelains, wherein the very particles to be isolated have of necessity been occluded and trapped within the structure of the filter itself. Another class of known filters comprises relatively thin films of cellulose esters or ethers which are the precipitated structures made by exposing to a non-solvent atmosphere or bath cellulose nitrate or acetate previously dispersed in organic solvents. Most of such filtration films must be supplied to the user in hermetically sealed containers in order that the gelation induced by the non-solvent will be maintained. The user is thus forced to perform the critical final steps of production or conditioning of the filter, or if the filter is supplied in a ready to use condition, it is so frangible and fragile that its actual use is limited to a very small exposure area. Industrial use has been found to be impractical for this type of filter. These cellulose-derivative filters, moreover, suffer from the structural defect known as "The Benard Effect," wherein certain turbulence areas appear to form in the sheet so that the product lacks uniformity of texture and non-isomorphism results.

Our invention in one aspect comprises a new and improved membranous filter which not only constitutes a highly satisfactory solution of the problem above set forth, but possesses unusual advantages and has a wide range of utility in many fields. We have discovered that the long-chain synthetic polymeric amide known as nylon, having recurring amide groups and of the type soluble in organic solvents may, by a novel process, be precipitated in such a manner as to form a membrane or film which has pores of such diameter as to permit the relatively free passage of air and liquids and at the same time retain upon its surface bacteria or other bodies of the infinitesimal dimensions which it is desired to separate from aerosols and hydrosols. The membrane or film of our invention is not only tough and flexible but is produced in a smooth wrinkle-free homogeneous condition, it may be easily and thoroughly sterilized without impairment, and is capable of immediate use without requiring any preliminary treatment in the field. Moreover, it retains the filtered material on its surface where it is readily accessible for culture or other treatment.

This invention is based on the discovery that certain solutions of nylon can be cast as a liquid film and then converted to a solid film which presents a microporous structure when dried. In carrying out the process of this invention, an alcohol-water solution containing nylon is first prepared and adjusted to the point of incipient precipitation. Certain ingredients are added which aid the formation of the desired microporous structure. A liquid film of this solution is then cast upon the smooth flat surface of a solid base and converted to a solid by inducing substantially complete precipitation of the nylon content.

The nylon solutions which may be used in the process of this invention include solutions of nylon in mixtures of lower aliphatic alcohols and water. As an example, we may use a mixture of 85% of 95% alcohol and 15% water. The nylon content of the solution is not critical and may range from say 10% to 50%, the nylon content controlling the gauge of the final film. To facilitate the solution of the nylon the solvent may be heated, for example from 140° to 160° F. The solution is then brought to the point of incipient precipitation by adding to the solution a solvent-miscible non-solvent which decreases the solubility of the nylon. This non-solvent is added to the point just prior to the formation of a precipitate of nylon. This point is indicated when a small amount of non-solvent added to a sample of the solution causes an obvious precipitation of nylon.

Additives which we find must be present to cause the formation of the desired microporous film may constitute the non-solvent itself or may be added to the non-solvent or to the nylon solution. Solvent-miscible non-solvents which possess the essential microporous promoting property include the lower aliphatic acid esters of lower aliphatic alcohols, glycols and lower aliphatic alcohol ethers of glycols. Additives which may be separately incorporated in the solution independently of the solvent-miscible non-solvents include boric acid and citric acid, and these may be dissolved in the non-solvent or added to the nylon solution prior to or after the addition of the non-solvent. The mechanism by which these additives influence the solid film is not known, but their presence is essential to the formation of a microporous film rather than a transparent relatively impermeable film normally deposited by nylon solutions.

The amount of additive required is small but excessive quantities have no harmful effect. When the additive constitutes the solvent-miscible non-solvent, the amount added to cause incipient precipitation is adequate. When the additive is separately incorporated, the amount required generally ranges from between 0.5 and 1.5% based on the total weight of solution.

The nylon solution, adjusted to the point of incipient precipitation and containing the proper additives, is cast as a liquid film on an optically smooth surface of a solid base and then converted to a solid film by exposure to an atmosphere containing a constantly maintained concentration of exchangeable non-solvent vapors, that is, vapors of a liquid in which nylon is not soluble but which are exchangeable with vapors of the solvent for the nylon.

An atmosphere saturated with water vapor is a particularly effective and convenient medium for exposing the film to convert it to the solid phase. Ammonia vapor is also effective, yielding a lofty film of highly delicate gel structure having somewhat finer pores. Preferably this atmosphere is maintained at or near room temperature in order to minimize turbulence caused by convection currents which would tend to disturb the uniformity of the film. The water in the atmosphere must be present as a vapor and not as drops or droplets, as aerosol particles will cause local surface irregularities. Equilibrium with the atmosphere has been observed to occur in about 88 hours, although microporous films can be produced after exposures as short as 3 hours. The length of time of exposure gives a convenient method of varying the porosity, the films produced after exposures of short duration being less porous than those which have been allowed to reach full equilibrium with the vapor-laden atmosphere.

The physical and chemical changes that occur during the exposure to vapor-laden atmosphere are not completely understood. Apparently the effect of attaining equilibrium with the vapor is a decrease in the affinity of the solution for the nylon and the formation of a hydrogel as nylon is released from the liquid phase. Probably the liquid film absorbs vapor from the atmosphere and releases some of the alcohol present in the solution, thereby tending toward a composition of lower solvent power with respect to nylon.

After the solid film is formed it may be dried in air at room temperature and thereafter washed in water to remove any occluded water soluble material, especially the additives, which may remain. After a final drying the sheet or film is ready for use and may, for instance, be mounted in rings for use as a filter. The drying of the hydrogel film does not result in any appreciable shrinkage, but rather appears to be a process whereby the liquid components of the hydrogel are replaced by air, the nylon structure remaining intact so that the film takes the form of an aerogel.

The following examples illustrate typical procedures for carrying out the process of this invention and are not intended to suggest limitations thereof.

A suitable nylon solution may be prepared as follows:

*Example 1*

A nylon solution is prepared by dissolving 59 grams of dry nylon, designated by the manufacturer as FM 6501, in a mixture of 147.7 grams of 95% ethyl alcohol and 93.3 grams of distilled water heated to from 140° to 160° F. to facilitate solution. Stirring is continued until a homogeneous solution results which is determined by taking viscosity measurements until a constant viscosity is reached. This solution contains 19.7% by weight of nylon.

*Example 2*

A solution higher in nylon content and useful for the preparation of thicker films is prepared by dissolving 167 grams of nylon in a solvent consisting of 205 grams of 95% ethyl alcohol and 36 grams of water by the procedure outlined in Example 1.

The nylon solutions are adjusted to the point of incipient precipitation by adding the solvent-miscible non-solvent gradually until the point is reached where an additional small amount of non-solvent will cause precipitation of nylon. To minimize the precipitating effect of local concentrations of non-solvent when it is introduced into the solution, it is desirable to mix with it a certain amount of solvent. A typical non-solvent is water, which is added as an alcohol-water mixture higher in water content than the solvent which also is an alcohol-water mixture. The additive is also conveniently incorporated in the non-solvent.

*Example 3*

The solution of Example 1 is adjusted to the point of incipient precipitation by adding it to a mixture consisting of 30 cc. distilled water, 50 cc. of 95% ethyl alcohol and 5 grams of c. p. boric acid, and mixing thoroughly. This solution is now ready to be cast as a liquid film. Upon complete precipitation of the nylon, drying and washing a thin sheet or film, about 0.003 inch in thickness results. This has all the characteristics of porosity and durability above set forth and presents a smooth unwrinkled mat surface, sometimes exhibiting the "Tyndall Effect."

When the solvent-miscible non-solvent is an acetate ester of a lower aliphatic alcohol, glycol or lower aliphatic alcohol ether of a glycol, it has been found that no additional additive is necessary, the ester itself performing the function of the additive as well as adjusting the solution to the point of incipient precipitation.

The reason for adding the foreign compound, boric acid, to the precipitating liquid is that, under certain conditions, the formation of the desired cellular porosity in the finished film is controlled and accelerated thereby. In the above example, we find that two grams of boric acid may be inadequate but that over five grams is unnecessary. Thus the optimum formula for that particular product requires c. p. boric acid in the range between two and five grams.

The mechanism of the precipitation of nylon lacquer to form our desired porous sheet is somewhat obscure and our term "additive" must at this time be used loosely to cover additives whose functions appear to be to develop an electrostatic atmosphere or field. They tend to prevent the nylon lacquer from forming a normal transparent or translucent non-porous film during the latter stages of its deposition or drying. Any other compound having the same properties as boric or citric acid in the nylon solution should be considered as the equivalent of these acids.

*Example 4*

To the 137.5 grams of the solution of Example 1 is added 39 cc. of Cellosolve acetate (the acetic acid ester of the monoethyl ether of ethylene glycol) and mixed thoroughly. This solution is ready to be cast as film.

The films of liquid solutions are formed by casting the solution as a thin liquid layer on a flat impermeable optically smooth surface, such as a sheet of glass. Alternatively an orthodox casting wheel may be used. Thereafter it is introduced into a chamber having an atmosphere of a constantly maintained high concentration of exchangeable vapors.

*Example 5*

The solution of Example 3 is cast on a glass surface and immediately introduced into a chamber having an atmosphere saturated with water vapor and maintained at 25° C. where it is allowed to dwell for 88 hours. After this exposure the film becomes a solid having a highly delicate gel structure. A stream of dry air is then introduced into the chamber until the film is dry. There is no noticeable shrinkage of the film due to the drying, rather the water appears to have been replaced by air resulting in the formation of an aerogel structure. Thereafter the film is washed in water to remove the additives and redried.

The film produced by this invention possesses unusual toughness and stability. It is ideally suited as a filter capable of removing particles as small as 0.2 micron in diameter and allowing for rapid filtration while being structurally strong and not requiring an additional supporting surface. There is, moreover, no tendency for the porous structure to collapse. A broth of high count of aerobacter aerogenes, for example, is filterable at the rate of 10 cc./second at 25° C. and under 14 mm. of mercury pressure through a disk of this improved film 1¾ inches in diameter. The combination of high permeability to liquids and the ability to remove particles as small as one-half or even one-fifth of one micron in diameter makes a filter membrane of our invention useful in the fields of water and air filtration, bacteriological analysis, and in such large scale applications as the filtration of beer and wines. The high tensile and shear strength of our film allows its use as filters of large dimensions.

In referring to the membranous filter of this invention as having "submicroscopic pores" it is meant that the pores are at least as small as ½ of 1 micron in diameter.

Its utility extends to other fields where a strong highly permeable sheet material is required, such as in fabrics for infants' pants, typewriter ribbons and pads, and any requirement where breathing or absorbency in a tough sheet is to be met.

This application is a continuation of our copending application, Ser. No. 184,265 filed September 11, 1950.

Having thus disclosed our invention and described in detail illustrative procedure for carrying it out, we claim as new and desire to secure by Letters Patent:

1. A process for preparing a self-sustaining non-transparent nylon film of microporous structure comprising forming a solution of nylon in a mixture of solvent and non-solvent at the point of incipient precipitation and including an additive selected from the group consisting of the lower aliphatic acid esters of lower aliphatic alcohols, glycols, lower aliphatic alcohol ethers of glycols, and solutions of citric acid and boric acid; casting said solution as a thin film on an impervious smooth surface; and finally causing substantially complete precipitation of the nylon within the solution to form a microporous film structure.

2. A process for preparing a self-sustaining non-transparent nylon film of microporous structure comprising forming a solution of nylon in a mixture of solvent and non-solvent at the point of incipient precipitation and including an additive selected from the group consisting of the lower aliphatic acid esters of lower aliphatic alcohols, glycols, lower aliphatic alcohol ethers of glycols, and solutions of citric acid and boric acid; casting said solution as a thin film on an impervious smooth surface; exposing the cast film to an atmosphere including vapors of a non-solvent exchangeable with the vapors of the solvent until the nylon has precipitated in the solution to form a microporous film structure.

3. A process for preparing a self-sustaining non-transparent nylon film of microporous structure comprising forming a solution of nylon in a mixture of solvent and non-solvent at the point of incipient precipitation and including an additive selected from the group consisting of the lower aliphatic acid esters of lower aliphatic alcohols, glycols, lower aliphatic alcohol ethers of glycols, and solutions of citric acid and boric acid; casting said solution as a thin film on an impervious smooth surface; exposing the cast film to an atmosphere saturated with water vapor until the nylon has precipitated in the solution to form a microporous film structure.

4. The process of making a tough durable filter membrane which includes the steps of dissolving nylon in ethyl alcohol and water to form a solution of 20–30% concentration, adding to said solution approximately 27% by weight of a mixture of water and ethyl alcohol of such proportion as to form a saturated solution, adding about 1½% boric acid, casting the resulting mixture upon an impervious supporting surface of a solid base, subjecting the cast film to an atmosphere of saturated water vapor, and then washing and drying the resulting membrane.

5. The process of preparing a tough flexible porous sheet of nylon which includes the steps of dissolving solid nylon in a lower alcohol solution, adding 1 to 3% of boric acid, adding water to the solution to the point of incipient precipitation, casting the solution in that condition upon a glass surface causing substantially complete precipitation within the solution, then drying the precipitated sheet, and finally washing to remove its water-soluble ingredients.

6. A self-sustaining aerogel film of non-transparent precipitated nylon having microporous pores rendering it permeable to water, retentive to particles larger than 0.2 micron in diameter and made by the process of claim 1.

7. The process of preparing a tough flexible porous sheet of nylon which includes the steps of dissolving solid nylon in a lower alcohol solution, adding 1 to 3% of citric acid, adding water to the solution to the point of incipient precipitation, casting the solution in that condition upon a glass surface causing substantially complete precipitation within the solution, then drying the precipitated sheet, and finally washing to remove its water-soluble ingredients.

References Cited in the file of this patent

UNITED STATES PATENTS

| 2,562,373 | Arnold | July 31, 1951 |
| 2,631,334 | Bailey | Mar. 17, 1953 |